Figure 3:
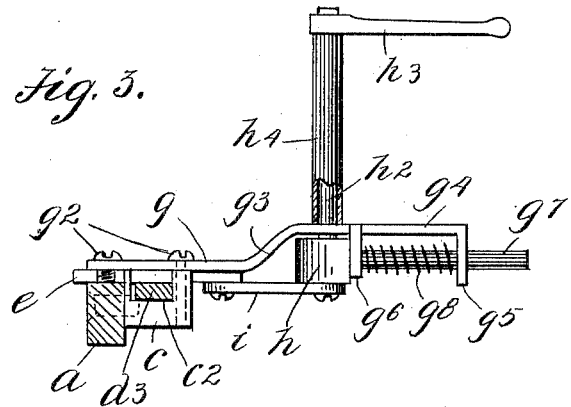

No. 759,090. PATENTED MAY 3, 1904.
F. A. GARDNER.
STEERING DEVICE FOR AUTOMOBILES.
APPLICATION FILED SEPT. 22, 1903.
NO MODEL. 2 SHEETS—SHEET 1.
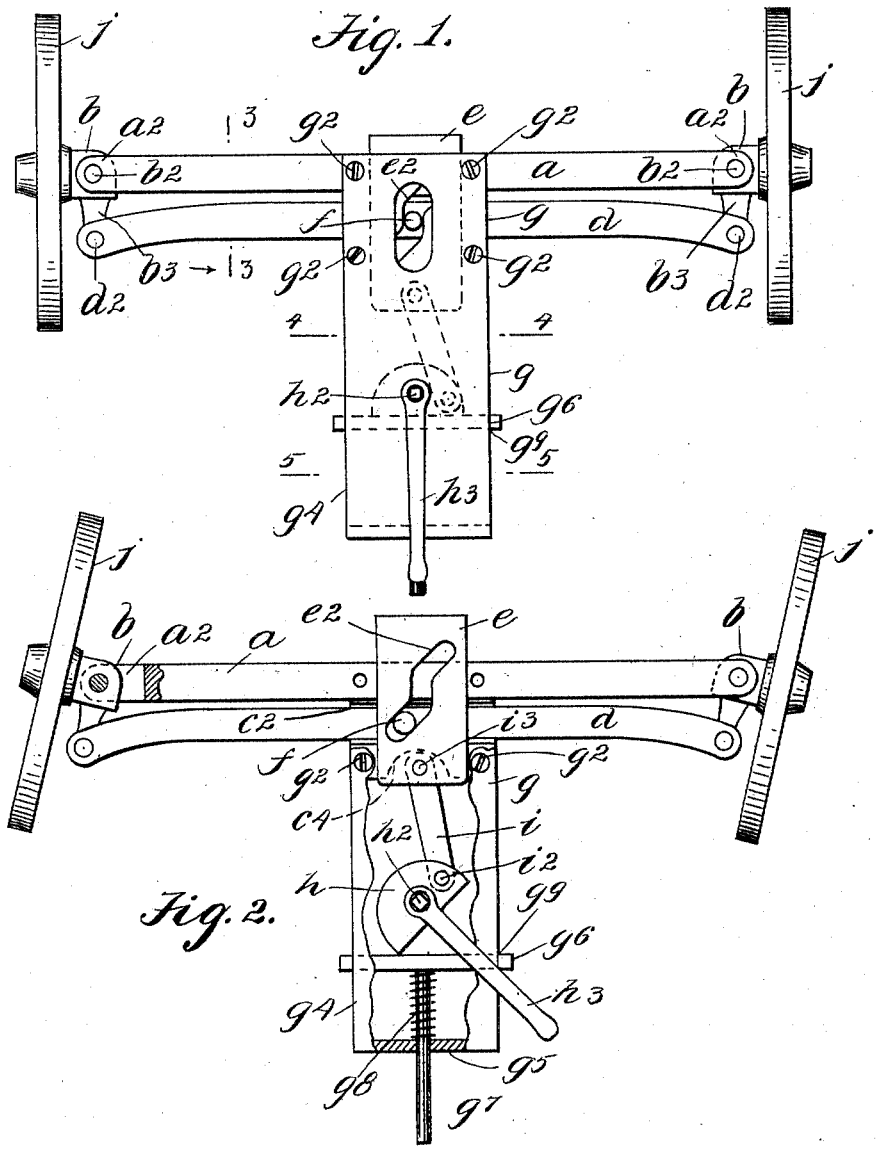
WITNESSES
INVENTOR
Frederick A. Gardner
BY Edgar Tate & Co.
ATTORNEYS No. 759,090. PATENTED MAY 3, 1904.
F. A. GARDNER.
STEERING DEVICE FOR AUTOMOBILES.
APPLICATION FILED SEPT. 22, 1903.
NO MODEL. 2 SHEETS—SHEET 2.

WITNESSES
INVENTOR
BY Frederick A. Gardner
ATTORNEYS

No. 759,090. Patented May 3, 1904.

UNITED STATES PATENT OFFICE.

FREDERICK A. GARDNER, OF CATSKILL, NEW YORK.

STEERING DEVICE FOR AUTOMOBILES.

SPECIFICATION forming part of Letters Patent No. 759,090, dated May 3, 1904.

Application filed September 22, 1903. Serial No. 174,171. (No model.)

*To all whom it may concern:*

Be it known that I, FREDERICK A. GARDNER, a citizen of the United States, residing at Catskill, in the county of Greene and State of New York, have invented certain new and useful Improvements in Steering Devices for Automobiles and other Road-Vehicles, of which the following is a specification such as will enable those skilled in the art to which it appertains to make and use the same.

The object of this invention is to provide improved means for steering or guiding an automobile or other road-vehicle, by means of which such vehicle may be safely and easily turned or guided and whereby the guiding-wheels may be locked straight ahead whenever desired; and with these and other objects in view the invention consists in the construction, combination, and arrangement of parts hereinafter described and claimed.

The invention is fully disclosed in the following specification, of which the accompanying drawings form a part, in which the separate parts of my improvement are designated by suitable reference characters in each of the views, and in which—

Figure 4:
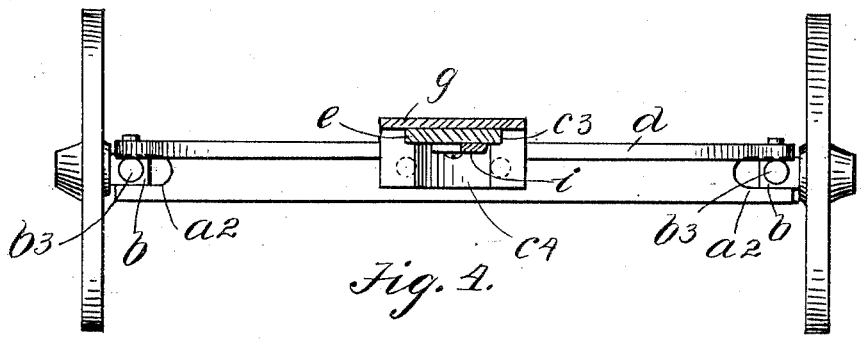
Figure 5:
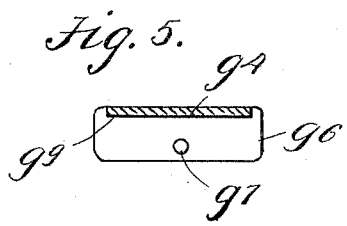

Figure 1 is a plan view of the front axle of an automobile or other road-vehicle and the connected wheels and provided with my improvement; Fig. 2, a similar view showing the parts in a different position and showing a part of the construction broken away; Fig. 3, a transverse section on the line 3 3 of Fig. 1; Fig. 4, a transverse section on the line 4 4 of Fig. 1, and Fig. 5 a transverse section on the line 5 5 of Fig. 1.

In the drawings forming part of this specification I have shown at $a$ a front axle of an automobile or other road-vehicle, and this axle in the form of construction shown is rectangular in cross-section and is provided at each end with a fork $a^2$, and the forks $a^2$ receive the angular heads or blocks $b$, with which the wheel-spindles are connected. The heads or blocks $b$ are pivoted in the forks $a^2$ by vertically-arranged pins $b^2$, and said heads or blocks and the corresponding spindles are adapted to swing in a horizontal plane, and the heads or blocks are also each provided with a backwardly-directed arm $b^3$.

Secured to the back of the axle $a$ and centrally thereof is a support $c$, having a transverse recess $c^2$, parallel with the axle $a$, and a forwardly and backwardly directed recess $c^3$, which ranges transversely of the said axle, and passing through the recess $c^2$ is a bar $d$, the opposite ends of which are pivoted to the arms $b^3$, as shown at $d^2$, and the ends of the bar $d$ are preferably curved backward slightly, as clearly shown in Figs. 1 and 2.

Mounted in the forwardly and backwardly ranging recess in the top of the support $c$ is a cam-plate $e$, the bottom surface of which is flush with the top surface of the axle $a$, and said cam-plate also rests on the bar $d$. The cam-plate $e$ is also provided with a cam slot or opening $e^2$, which ranges diagonally thereof, but the central portion of which is parallel with the sides of said plate, and secured to the bar $d$, centrally thereof, or formed integrally with said bar is a cam-pin $f$, which fits in the slot or opening $e^2$ and is adapted to move therein.

Secured to the top of the support $c$ and to the front axle $a$ is a plate $g$, the connection of said plate with said support and the front axle being made by means of screws, bolts, or similar devices $g^2$, and in practice the rear end of this plate is rigidly secured in the front or framework of the vehicle, and said rear end extends backwardly of the front axle a predetermined distance. The plate $g$ is bent upwardly centrally thereof, as shown at $g^3$ in Fig. 3, and the rear end thereof extended backwardly parallel with the front end thereof, as shown at $g^4$ in Fig. 3, and said rear end portion of the plate $g^4$ is provided at its rear end with a downwardly-directed plate member $g^5$ and forwardly thereof with a downwardly-directed plate member $g^6$, and secured to or connected with the member $g^6$ in any desired manner is a pin, shaft, or bolt $g^7$, which passes backwardly through the plate member $g^5$ and on which is placed a spiral spring $g^8$, which normally serves to force the plate member $g^6$ forwardly. The plate member $g^6$ is free to slide on the bottom of the rear end $g^4$ of the plate $g$ and is held in place by the pin, shaft, or bolt $g^7$, and the top edge of the plate member $g^6$ is provided with a recess in which the rear end $g^4$ of the plate $g$ fits, as shown at $g^9$ in Figs. 1 and 2. The forward movement of the plate member $g^6$ is limited by a cam-block $h$, which is secured to the lower end of a shaft $h^2$, which passes upwardly through the plate $g$ and is provided at its upper end with a crank or handle $h^3$, which is detachable therefrom in the ordinary manner, and that portion of the shaft $h^2$ above the plate $g$ is preferably inclosed by a sleeve $h^4$. The cam-block $h$ is in the form of a half-circle, and the plate member $g^6$ normally presses on the straight side thereof, as indicated in Figs. 1 and 3, and connected with the said cam-block, near one of the corners thereof, is a link bar $i$, one end of which is connected with the cam-plate $e$, these connections being made, respectively, at $i^2$ and $i^3$, and the rear side of the support $c$ is provided with a segmental recess $c^4$ to facilitate the connection of the link bar $i$ with the cam-plate $e$ and the operation of said link bar.

When the parts are in the position shown in Fig. 1, the wheels $j$ are locked straight ahead, the cam-pin $f$ being in the central portion of the cam slot or opening $e^2$ in the cam-plate $e$, which portion of said slot or opening is parallel with the longitudinal center of the vehicle, or at right angles to the axle $a$. Whenever it is desired to turn the vehicle or to turn the wheels of the front axle $a$ into the position shown in Fig. 2, the crank or handle $h^3$ is operated to throw the cam-block $h$ into the position shown in Fig. 2, and in this operation the cam-plate $e$ is forced forwardly and the cam-pin $f$, moving in the slot or opening $d^2$, forces the bar $d$ to the left and turns the wheels into the position shown in said figure. When the crank or handle $h^3$ is turned backward into the position shown in Fig. 1, the parts again assume the position in which the wheels are straight ahead, and in this position the wheels are locked until the crank or handle $h^3$ is again manipulated, and if the crank or handle $h^3$ be turned to the left the wheels $j$ will be turned in the opposite direction from that shown in Fig. 2.

It will be understood that the parts are normally held in the position shown in Fig. 1 by the spring $g^8$, and they can only be thrown out of this position or the wheels $j$ can only be turned into another position in order to change the course of the vehicle by the manipulation of the crank or handle $h^3$, as hereinbefore described.

My improved steering or guiding mechanism for automobiles and other vehicles may be connected with the structural part of the truck or frame of the vehicle in any desired manner, and it will also be apparent that the plate $g$, which is shown in the drawings as comprising the members $g^3$ and $g^4$, to the latter of which the plate member $g^5$ is rigidly connected and in connection with which the plate member $g^6$, which constitutes simply a movable slide, operates, may be constructed or formed in any desired manner and may be secured in the truck or vehicle frame in any desired position or by any preferred means, the exact form of these parts and their method of construction and the means by which they are supported and secured into position being immaterial.

Having fully described my invention, what I claim as new, and desire to secure by Letters Patent, is—

1. The combination with the front axle of an automobile or other road-vehicle, of heads or blocks pivoted horizontally in the ends of said axle and provided with wheel-spindles, said heads or blocks being also provided with backwardly-directed arms, an operating-bar arranged rearwardly of said axle and substantially parallel therewith and the ends of which are pivotally connected with said arms, a transversely-movable cam-plate mounted over said axle and said bar and provided with a cam slot or opening which ranges diagonally thereof and the central portion of which is at right angles to said axle and bar, said bar being also provided with a cam-pin movable in said slot or opening, and means for moving said cam-plate transversely of said axle and bar, substantially as shown and described.

2. The combination with the front axle of an automobile or other road-vehicle, of heads or blocks pivoted horizontally in the ends of said axle and provided with wheel-spindles, said heads or blocks being also provided with backwardly-directed arms, an operating-bar arranged rearwardly of said axle and substantially parallel therewith and the ends of which are pivotally connected with said arms, a transversely-movable cam-plate mounted over said axle and said bar and provided with a cam slot or opening which ranges diagonally thereof and the central portion of which is at right angles to said axle and bar, said bar being also provided with a cam-pin movable in said slot or opening, and means for moving said cam-plate transversely of said axle and bar, comprising a cam-block pivotally supported rearwardly of said axle and bar and in operative connection with said cam-plate, a vertically-arranged shaft connected with said cam-block and means for normally holding said parts so that the cam-pin will rest in the central portion of the slot or opening in the cam-plate, substantially as shown and described.

3. The combination with the front axle of an automobile or other road-vehicle, of heads or blocks pivoted horizontally in the ends of said axle and provided with wheel-spindles, said heads or blocks being also provided with backwardly-directed arms, an operating-bar arranged rearwardly of said axle and substantially parallel therewith and the ends of which are pivotally connected with said arms, a transversely-movable cam-plate mounted over said axle and said bar and provided with a cam slot or opening which ranges diagonally thereof and the central portion of which is at right angles to said axle and bar, said bar being also provided with a cam-pin movable in said slot or opening, and means for moving said cam-plate transversely of said axle and bar, comprising a cam-block pivotally supported rearwardly of said axle and bar and in operative connection with said cam-plate, a vertically-arranged shaft connected with said cam-block and means for normally holding said parts so that the cam-pin will rest in the central portion of the slot or opening in the cam-plate, comprising a spring-pressed member which bears on one side of the cam-block, substantially as shown and described.

In testimony that I claim the foregoing as my invention I have signed my name, in presence of the subscribing witnesses, this 21st day of September, 1903.

FREDERICK A. GARDNER.

Witnesses:
F. A. STEWART,
C. E. MULREANY.